(12) United States Patent
McMahan (10) Patent No.: US 11,987,373 B2
(45) Date of Patent: May 21, 2024

(54) AIRCRAFT SAFETY KEEPER FOR LATCH UTILIZATION

(71) Applicant: Rohr, Inc., Chula Vista, CA (US)

(72) Inventor: Paul F. McMahan, College Station, TX (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/716,897

(22) Filed: Apr. 8, 2022

(65) Prior Publication Data

US 2023/0322399 A1    Oct. 12, 2023

(51) Int. Cl.
*B64D 29/06*    (2006.01)
*E05C 19/14*    (2006.01)

(52) U.S. Cl.
CPC ............ *B64D 29/06* (2013.01); *E05C 19/145* (2013.01)

(58) Field of Classification Search
CPC ......... B64D 29/06; B64D 29/08; E05C 19/14; E05C 19/145
See application file for complete search history.

(56) References Cited

U.S. PATENT DOCUMENTS

| | | | |
|---|---|---|---|
| 2,945,274 A | | 7/1960 | Paterson |
| 3,083,426 A | | 4/1963 | Neilson |
| 3,347,578 A | | 10/1967 | Robert et al. |
| 4,385,423 A | | 5/1983 | Vermilye |
| 4,557,441 A | * | 12/1985 | Aspinall ............... B25B 25/00 244/129.4 |
| 5,076,514 A | * | 12/1991 | Melcher ............... E05B 15/025 244/129.4 |
| 9,469,392 B2 | | 10/2016 | Fox et al. |
| 9,744,576 B2 | | 8/2017 | Gaines et al. |
| 2011/0113837 A1 | | 5/2011 | Soulier et al. |
| 2015/0300061 A1 | * | 10/2015 | Fabre ..................... F02C 7/20 292/113 |

FOREIGN PATENT DOCUMENTS

| | | |
|---|---|---|
| CH | 443018 | 8/1967 |
| FR | 2299485 | 8/1976 |

OTHER PUBLICATIONS

European Patent Office, European Search Report dated Mar. 23, 2023 in Application No. 22204386.1.
U.S. Appl. No. 17/525,684, filed Nov. 12, 2021 and entitled "Aircraft Safety Latch", 22 pages.
European Patent Office, European Search Report dated Sep. 29, 2023 in Application No. 23176213.9.
USPTO; Non-Final Office Action dated Aug. 15, 2023 in U.S. Appl. No. 17/525,684.
USPTO; Final Office Action dated Jan. 10, 2024 in U.S. Appl. No. 17/525,684.
USPTO; Advisory Action dated Mar. 13, 2024 in U.S. Appl. No. 17/525,684.

* cited by examiner

*Primary Examiner* — Andrew H Nguyen
(74) *Attorney, Agent, or Firm* — SNELL & WILMER L.L.P.

(57) ABSTRACT

A latch mechanism is disclosed. In various embodiments, the latch mechanism includes a T-bolt body and a T-bolt comprising a longitudinal rod extending in a longitudinal direction from the T-bolt body and a transverse rod disposed at an end of the longitudinal rod. A safety keeper defining a load slot may be configured to receive the transverse rod whereby the T-bolt is configured to secure the T-bolt body with respect to the safety keeper.

16 Claims, 5 Drawing Sheets

AIRCRAFT SAFETY KEEPER FOR LATCH UTILIZATION

FIELD

The present disclosure relates generally to latch mechanisms and, more particularly, to latch mechanisms used with aircraft.

BACKGROUND

Various latching mechanisms exist for use in aircraft as aircraft have many components, such as fuselage panels, including cowlings and the like, which must be opened and closed securely. For example, tension latches mounted on a first panel are typically configured to cinch to a keeper on a second panel to hold the first panel, which may be a moveable panel, closed relative to the second panel. Other latches include sliding toggle linkages to minimize the kinematic envelope of the latch. These linkages rotate around a mounting pin to produce the latch reach. The complexity of certain aircraft latches makes them relatively large and heavy, which is disfavored in aircraft. Accordingly, it is desirable to provide a latch having a reduced size and weight, but that exhibits the strength of larger and heavier latches. Also desirable is a design exhibiting robustness and reduced tendency to disengage during flight of the aircraft.

SUMMARY

A latch mechanism is disclosed, comprising a T-bolt body, a T-bolt comprising a longitudinal rod extending in a longitudinal direction from the T-bolt body and a transverse rod disposed at an end of the longitudinal rod, and a safety keeper defining a load slot configured to receive the transverse rod whereby the T-bolt is configured to secure the T-bolt body with respect to the safety keeper.

In various embodiments, the T-bolt body comprises an axial cutout extending longitudinally, wherein the axial cutout is configured to receive a pin and enable the T-bolt body to slide in the longitudinal direction with respect to the pin.

In various embodiments, the latch mechanism further comprises a latch handle pivotally coupled to the T-bolt body, wherein the T-bolt is configured to translate along the longitudinal direction with respect to the safety keeper in response to the latch handle moving between an open position and a closed position.

In various embodiments, the T-bolt is adjustable along the longitudinal direction with respect to the T-bolt body.

In various embodiments, the safety keeper further comprises a transverse pin configured for coupling the safety keeper to a cowl panel.

In various embodiments, the safety keeper further comprises a safety keeper longitudinal rod configured for coupling the safety keeper to a cowl panel.

In various embodiments, the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

In various embodiments, the transverse rod defines a characteristic dimension that is approximately equal to a lateral dimension of at least one of the T-bolt loading portion or the T-bolt receiving portion.

A latch mechanism is disclosed, comprising a T-bolt body, a latch handle pivotally coupled to the T-bolt body, and a T-bolt comprising a longitudinal rod extending in a longitudinal direction from the T-bolt body, wherein a transverse rod is disposed at an end of the longitudinal rod located externally from the T-bolt body, wherein the transverse rod is configured to translate along the longitudinal direction in response to the latch handle moving between a closed position and an open position.

In various embodiments, the latch mechanism further comprises a safety keeper defining a load slot configured to receive the transverse rod to enable the T-bolt to secure the T-bolt body with respect to the safety keeper.

In various embodiments, the safety keeper further comprises a transverse pin configured for coupling the safety keeper to a cowl panel.

In various embodiments, the safety keeper further comprises a safety keeper longitudinal rod configured for coupling the safety keeper to a cowl panel.

In various embodiments, the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

In various embodiments, the safety keeper comprises a first longitudinal member and a second longitudinal member, and the load slot is disposed between the first longitudinal member and the second longitudinal member.

In various embodiments, the T-bolt receiving portion is disposed in the second longitudinal member.

In various embodiments, the T-bolt body comprises an axial cutout extending longitudinally, wherein the axial cutout is configured to receive a pin and enable the T-bolt body to slide in the longitudinal direction with respect to the pin.

A nacelle is disclosed, comprising a first cowl panel, a second cowl panel moveable with respect to the first cowl panel, and a latch mechanism configured to secure the first cowl panel with respect to the second cowl panel. The latch mechanism comprises a T-bolt body mounted to the first cowl panel, a T-bolt comprising a longitudinal rod extending in a longitudinal direction from the T-bolt body and a transverse rod disposed at an end of the longitudinal rod, and a safety keeper mounted to the second cowl panel, the safety keeper defining a load slot configured to receive the transverse rod whereby the T-bolt is configured to secure the T-bolt body with respect to the safety keeper for securing the first cowl panel with respect to the second cowl panel.

In various embodiments, the T-bolt body comprises an axial cutout extending longitudinally, wherein the axial cutout is configured to receive a pin and enable the T-bolt body to slide in the longitudinal direction with respect to the pin.

In various embodiments, the T-bolt body is pivotally mounted to the first cowl panel via the pin.

In various embodiments, the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
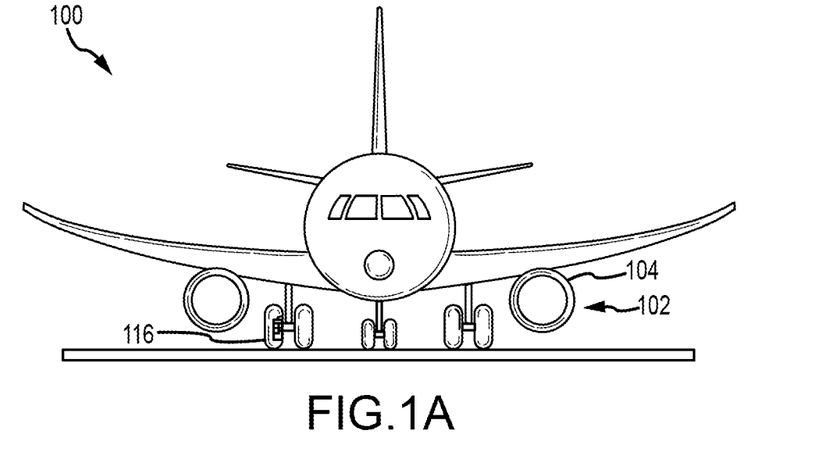
FIGS. 1A and 1B provide schematic illustrations of an aircraft having and aircraft propulsion system, in accordance with various embodiments.
Figure 1B:
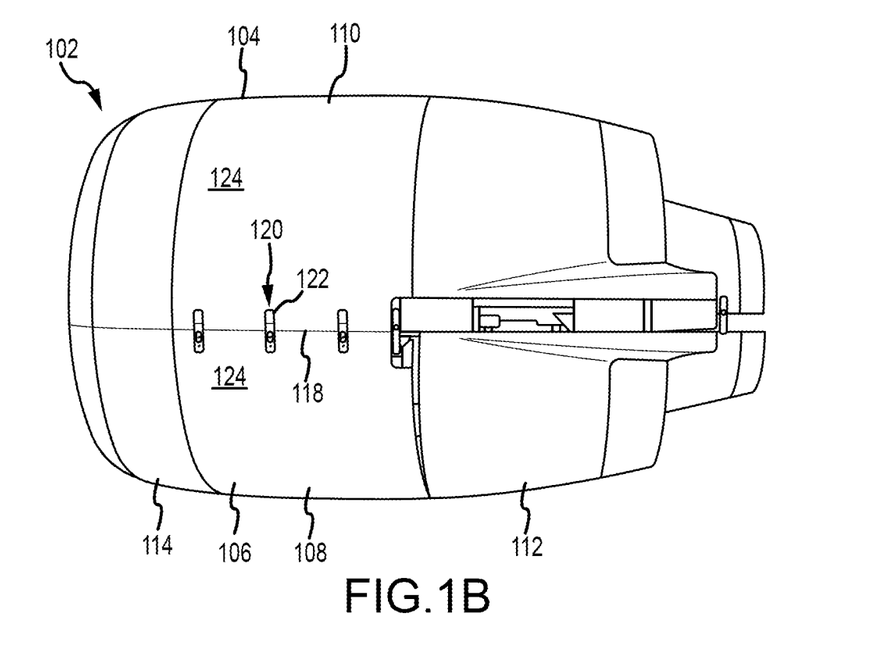

Referring now to the drawings, FIGS. 1A and 1B provide schematic illustrations of an aircraft 100 having an aircraft propulsion system 102, in accordance with various embodiments. The aircraft propulsion system 102 may include various systems, such as, for example, a gas turbine engine system housed within a nacelle 104. The nacelle 104 typically comprises a plurality of aerodynamic panels, such as, for example, one or more core cowl panels 106 (e.g., a first core cowl panel 108 and a second core cowl panel 110), one or more thrust reverser panels 112 and one or more fan cowl panels 114, each of which may be removable, hinged, or otherwise configurable to enable access to internal components of the aircraft 100 or the aircraft propulsion system 102. The aircraft 100 may also include various additional systems, such as, for example, one or more landing gear 116, which generally support the aircraft 100 when the aircraft 100 is not flying, allowing the aircraft 100 to taxi, takeoff or land without damage.

In various embodiments and with additional reference to the nacelle 104 illustrated in FIG. 1B, the first core cowl panel 108 and the second core cowl panel 110 are coupled, in various embodiments, along a seam 118 by a latch mechanism 120 (or a plurality of latch mechanisms). In the latched state, a latch handle 122 of the latch mechanism 120 may sit relatively flush or may be recessed within an aerodynamic panel surface 124 defined by the first core cowl panel 108 and the second core cowl panel 110. In the unlatched state, the latch handle 122 of the latch mechanism 120 may protrude above or outside of the aerodynamic panel surface 124. While the foregoing description of the latch mechanism 120 is presented with reference to the first core cowl panel 108 and the second core cowl panel 110, a similar description may be provided with reference to other panel assemblies of the aircraft 100 or the aircraft propulsion system 102, including, for example, the one or more thrust reverser panels 112 and the one or more fan cowl panels 114.

Figure 2A:
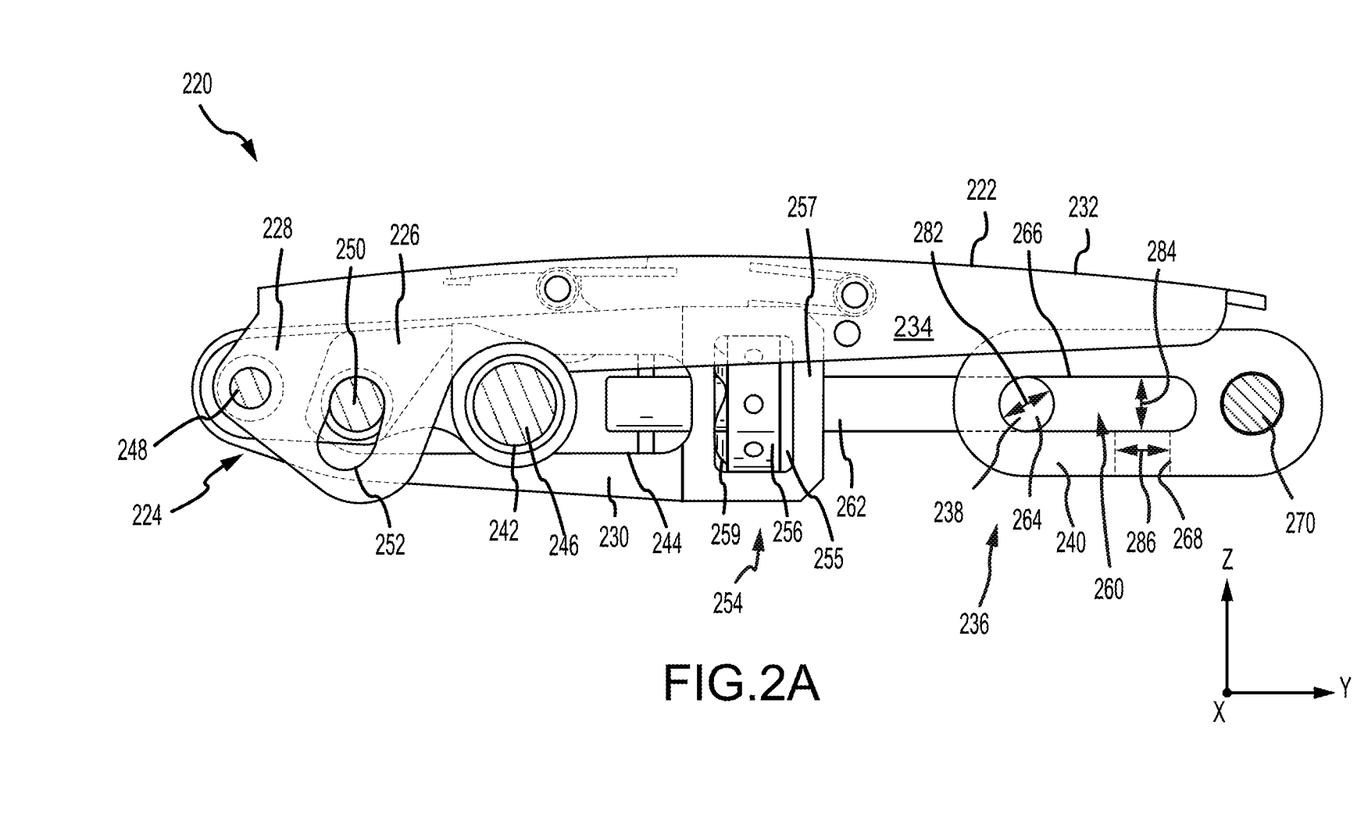
FIG. 2A provides a perspective schematic illustration of a latch mechanism, in accordance with various embodiments.
Figure 2B:
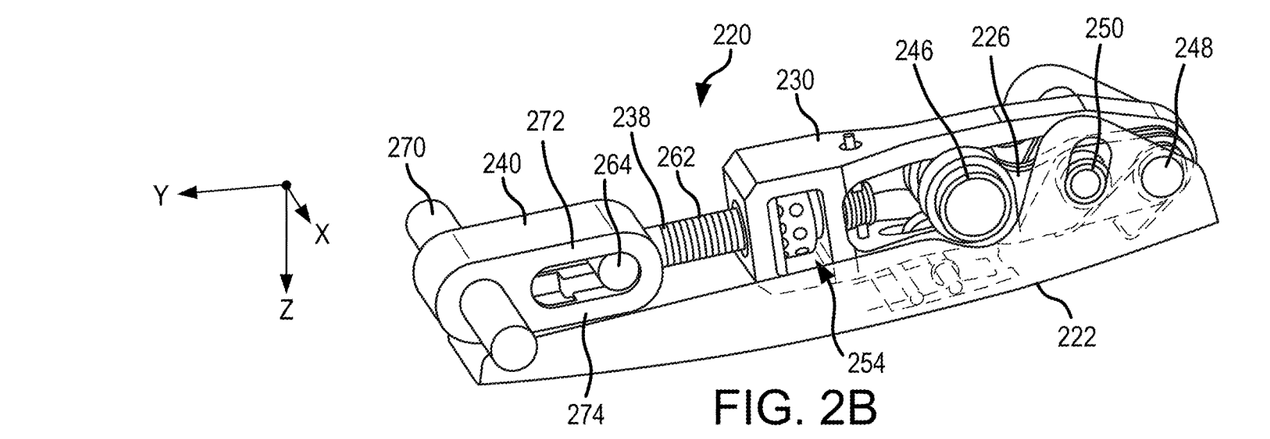
FIG. 2B provides a perspective schematic illustration of a latch mechanism, in accordance with various embodiments.

Referring now to FIG. 2A and FIG. 2B, a latch mechanism 220 (e.g., a latch mechanism for an aircraft panel), similar to the latch mechanism 120 described above with reference to FIG. 1B, is illustrated and its operation described. In various embodiments, latch mechanism 220 is an over-center latch mechanism. The latch mechanism 220 comprises a latch handle 222 pivotally coupled to a body 230 (also referred to herein as a T-bolt body). The latch handle 222 may be further coupled to a latch linkage 224. In various embodiments, the latch linkage 224 includes a first link 226 (or a forward link) and a second link 228 (or an aft link). The latch handle 222 includes an upper surface 232 extending between a first face 234 and a second face (opposite the first face 234) to define, in cross section through the ZX-plane, a relatively U-shaped latch handle. The first link 226 is configured to pivot about an axle 242 and to slide in an axial direction (i.e., in the Y-direction) with respect to an axial cutout 244 of the body 230. The axle 242 extends through the axial cutout 244 and is typically connected to a cowl panel, such as, for example, the second core cowl panel 110 described above, via a first pin 246 (or a forward pin) that extends through the axle 242. In this manner, the first pin 246 may enable the body 230 to slide in the longitudinal direction with respect to the first pin 246 in response to the latch handle 222 moving between a closed position and an open position. The second link 228 is pivotally connected to the latch handle 222 and to the body 230 via a second pin 248 (or an aft pin), while both the first link 226 and the second link 228 are pivotally connected to each other via a third pin 250.

The latch mechanism 220 also includes a lock mechanism 236, including a T-bolt 238 and a keeper 240 (also referred to herein as a safety keeper). In various embodiments, the T-bolt 238 is a T-shaped piece of material (e.g., metal) having a longitudinal rod 262 (e.g., a first rod extending in the Y-direction or a longitudinal direction) and a transverse rod 264 (e.g., a second rod extending in the X-direction or a lateral direction). Transverse rod 264 may be attached to an end of the longitudinal rod 262. In various embodiments, transverse rod 264 and longitudinal rod 262 are formed as a single piece of material (e.g., an integral or monolithic structure). In various embodiments, the transverse rod 264 defines a diameter 282 (or a characteristic dimension) that is approximately equal to a lateral dimension 284 (i.e., in the Z-direction) of a T-bolt loading portion 266 (or a longitudinal slot) of a load slot 260 and to a longitudinal dimension 286 (i.e., in the Y-direction) of a T-bolt receiving portion 268 (or a lateral slot) of the load slot 260, wherein the term "approximately" as used in this context can only mean between 90% and 100% of the lateral dimension 284 and/or the longitudinal dimension 286. The diameter 282 may be between 75% and 100% of the lateral dimension 284 and/or of the longitudinal dimension 286 in various embodiments, between 85% and 100% of the lateral dimension 284 and/or of the longitudinal dimension 286 in various embodiments, or between 90% and 100% of the lateral dimension 284 and/or of the longitudinal dimension 286 in various embodiments. The diameter 282 may be between 75% and 99% of the lateral dimension 284 and/or of the longitudinal dimension 286 in various embodiments, between 85% and 98% of the lateral dimension 284 and/or of the longitudinal dimension 286 in various embodiments, or between 80% and 98% of the lateral dimension 284 and/or of the longitudinal dimension 286 in various embodiments. As illustrated, in various embodiments, the T-bolt loading portion 266 (or longitudinal slot) and the T-bolt receiving portion 268 (or lateral slot) are generally perpendicular to one another in the YZ-plane. Note that while the longitudinal rod 262 and the transverse rod 264 are described and illustrated as having generally circular cross-sectional geometries, other cross-sectional geometries, such as, for example, square or N-pentagonal (where N is the number of sides) cross-sectional geometries are also contemplated.

The safety keeper 240 includes a plurality of longitudinal members extending in a longitudinal direction (i.e., the Y-direction), including a first longitudinal member 272 and a second longitudinal member 274, the second longitudinal member 274 spaced a lateral distance (i.e., in the Z-direction) from the first longitudinal member 272. The first longitudinal member 272 and the second longitudinal member 274 at least partially define the load slot 260. The load slot 260 is disposed between the first longitudinal member 272 and the second longitudinal member 274. Safety keeper 240 may surround the entire perimeter of load slot 260 when viewed from the side (i.e., along the X-direction). In this manner, the transverse rod 264 may be entirely surrounded by safety keeper 240 when the transverse rod 264 is in the load slot 260, with the only means for decoupling the transverse rod 264 from safety keeper 240 being to align the transverse rod 264 with the T-bolt receiving portion 268 whereby the transverse rod 264 may exit the T-bolt loading portion 266, as described herein. The T-bolt receiving portion 268 may be disposed in the second longitudinal member 274.

The T-bolt 238 may be adjustably coupled (i.e., in the Y-direction or a longitudinal direction) to the body 230. Safety keeper 240 may be mounted to a cowl panel, such as, for example, the first core cowl panel 108 (or the second core cowl panel 110) described above. Safety keeper 240 may be coupled to a first cowl panel (e.g., first core cowl panel 108) and T-bolt 238 may be coupled to a second cowl panel (e.g., second core cowl panel 110). T-bolt 238 may be configured to removably couple with safety keeper 240. In this manner, safety keeper 240 may be removably coupled with T-bolt 238 to secure the first and second cowl panels in a closed position, and may further provide a load path between the two cowl panels along a hoop direction or the longitudinal direction (i.e., in the Y-direction in FIG. 2A).

In operation, (e.g., when decoupling the first core cowl panel 108 and the second core cowl panel 110), the latch handle 222 is rotated about the second pin 248 and away from the body 230, causing the first link 226 and the second link 228 to articulate with respect to each other about the third pin 250. The mutual articulation about the third pin 250, caused by engagement of a channel 252 cut into the latch handle 222 with the third pin 250, thereby further causes the body 230, together with the T-bolt 238, to be urged in an axial direction (i.e., the Y-direction) with respect to the first pin 246, which remains stationary with respect to the cowl panel to which the latch mechanism 220 is connected (e.g., the second core cowl panel 110). Once the T-bolt 238 is decoupled from safety keeper 240, the first core cowl panel 108 and the second core cowl panel 110 may be decoupled. Coupling the first core cowl panel 108 and the second core cowl panel 110 is accomplished by reversing the operational steps above described.

In various embodiments, the coupling and decoupling of the latch mechanism 220 to safety keeper 240 may be adjusted by adjusting the location of the T-bolt 238 with respect to the body 230 using an adjustment mechanism 254 that comprises, for example, an adjustment nut 256 threadedly coupled to a shaft 258 that is connected to the T-bolt 238. In various embodiments, the shaft 258 is formed integrally with the T-bolt 238 (i.e., the shaft 258 and the T-bolt 238 comprising a single piece of material). Rotating the adjustment nut 256 in a first direction, for example, increases the distance (or axial position) between the T-bolt 238 and the body 230, while rotating the adjustment nut 256 in a second direction decreases the distance (or axial position) between the T-bolt 238 and the body 230. In this manner, adjustment nut 256 may be configured to provide a preload and/or take-up adjustment to the T-bolt 238. In various embodiments, a bearing block 255 is positioned between the adjustment nut 256 and a body load bearing plate 257 of the body 230, while a bias element 259 (e.g., a wave spring) is disposed aft of the adjustment nut 256 and configured to bias the adjustment nut 256 toward the bearing block 255 and the body load bearing plate 257 when the latch mechanism 220 assumes a decoupled or an unloaded state.

Figure 3:
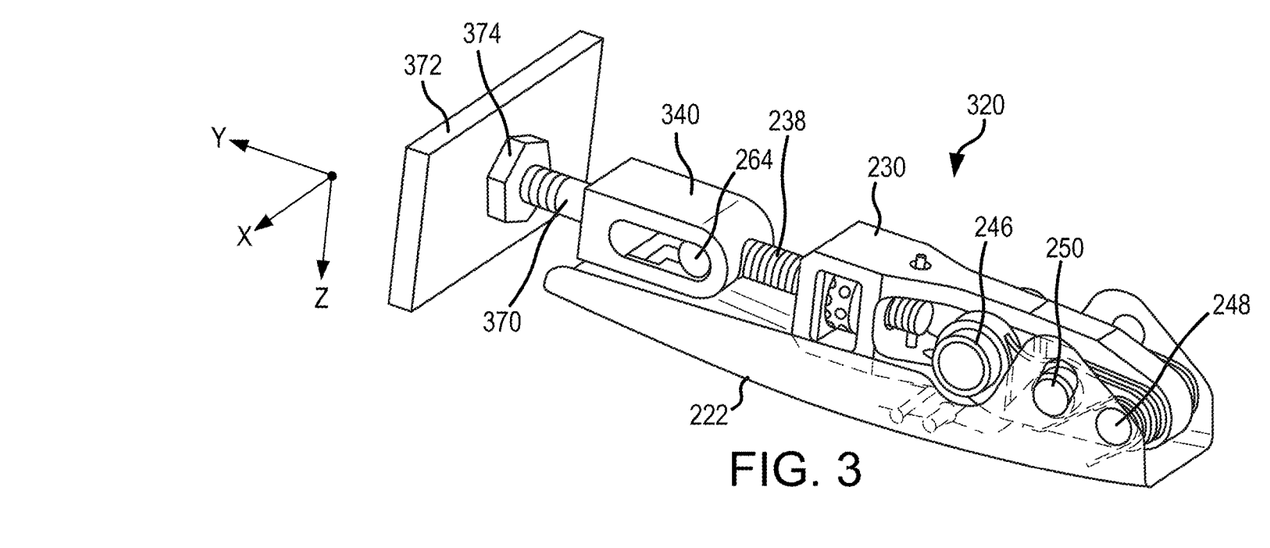
FIG. 3 provides a perspective schematic illustration of a latch mechanism, in accordance with various embodiments.

Safety keeper 240 may be mounted to a cowl panel, such as, for example, the first core cowl panel 108 (or the second core cowl panel 110) via a variety of methods. For example, with combined reference to FIG. 2A and FIG. 2B, safety keeper 240 may be mounted to a cowl panel, such as, for example, the first core cowl panel 108 (or the second core cowl panel 110) via a transverse pin 270 (e.g., a pin extending in the X-direction or a lateral direction), in accordance with various embodiments. Pin 270 may extend through safety keeper 240 to secure safety keeper 240 to the cowl panel. In various embodiments, pin 270 and safety keeper 240 are formed as a single piece of material. In various embodiments, pin 270 is removably coupled to safety keeper 240. Transverse pin 270 may be longitudinally spaced apart from load slot 260. In various embodiments, and with reference to FIG. 3, safety keeper 340 may be mounted to a cowl panel, such as, for example, the first core cowl panel 108 (or the second core cowl panel 110) via a longitudinal rod 370 (e.g., a rod extending in the Y-direction or a longitudinal direction) and a plate or web 372 whereupon safety keeper longitudinal rod 370 is mounted. Safety keeper longitudinal rod 370 may be a threaded rod. In this manner, the position (e.g., along the Y-direction) of safety keeper 340 with respect to body 230 and/or T-bolt 238 may be adjusted with safety keeper longitudinal rod 370. In various embodiments, web 372 may comprise a threaded fastener 374 whereby safety keeper longitudinal rod 370 is coupled to web 372 via a threaded connection. In various embodiments, safety keeper longitudinal rod 370 may replace adjustment mechanism 254 for adjusting the position of safety keeper 340 with respect to T-bolt 238, though it is also contemplated that safety keeper longitudinal rod 370 and adjustment mechanism 254 may both be provided. In various embodiments, safety keeper 340 may be non-adjustably coupled to web 372 via safety keeper longitudinal rod 370. It should be understood that safety keeper 340 may be coupled to a cowl panel via any suitable method and the scope of the present disclosure is not be particularly limited in this regard.

Figure 4A:
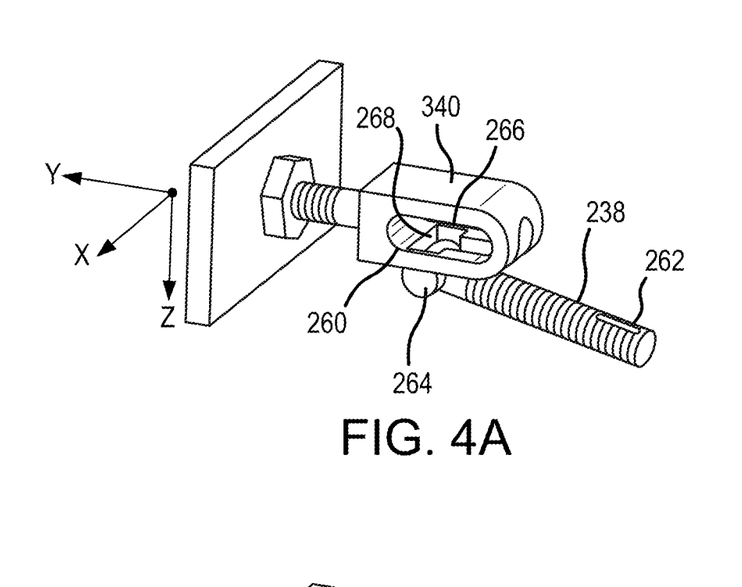
FIG. 4A, FIG. 4B, FIG. 4C, and FIG. 4D provide perspective schematic illustrations of a T-bolt of a latch mechanism being coupled to a safety keeper, in accordance with various embodiments.
Figure 4B:
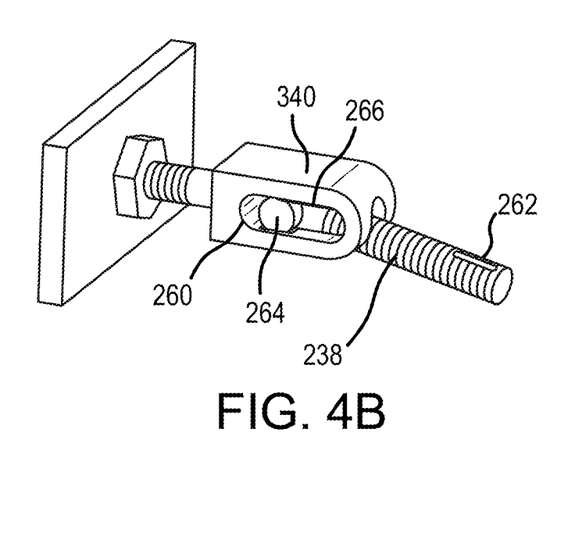
Figure 4C:
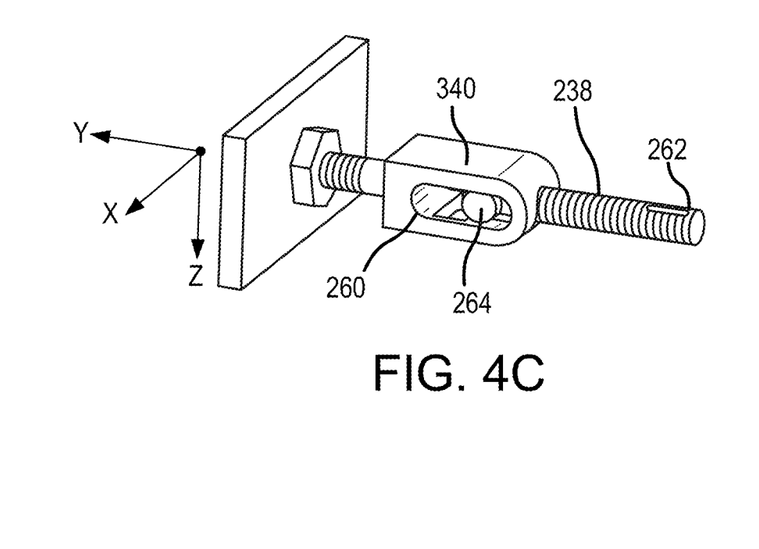
Figure 4D:
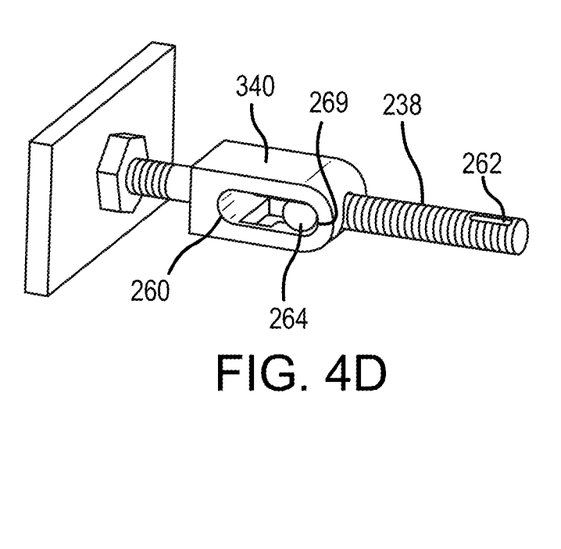

With reference to FIG. 4A through FIG. 4D, steps for installing T-bolt 238 into safety keeper 340 are illustrated, in accordance with various embodiments. With reference to FIG. 4A, prior to coupling the T-bolt 238 with safety keeper 340, transverse rod 264 of the T-bolt 238 is aligned with the T-bolt receiving portion 268 of the load slot 260. Once aligned, the transverse rod 264 is inserted into the T-bolt receiving portion 268 and translated toward the T-bolt loading portion 266, typically by rotating the T-bolt 238 toward safety keeper 340. As illustrated in FIG. 4B, once the transverse rod 264 is disposed within the T-bolt loading portion 266 of the load slot 260, the T-bolt 238 is translated (see FIG. 4C) in a longitudinal direction (i.e., the -Y direction) until a loading end 269 of the T-bolt loading portion 266 is engaged and loaded against the transverse rod 264 (see FIG. 4D). The T-bolt 238 and safety keeper 340 are then coupled or engaged. Decoupling or disengaging the T-bolt 238 and safety keeper 340 is accomplished by reversing the steps outlined above.

Figure 5A:
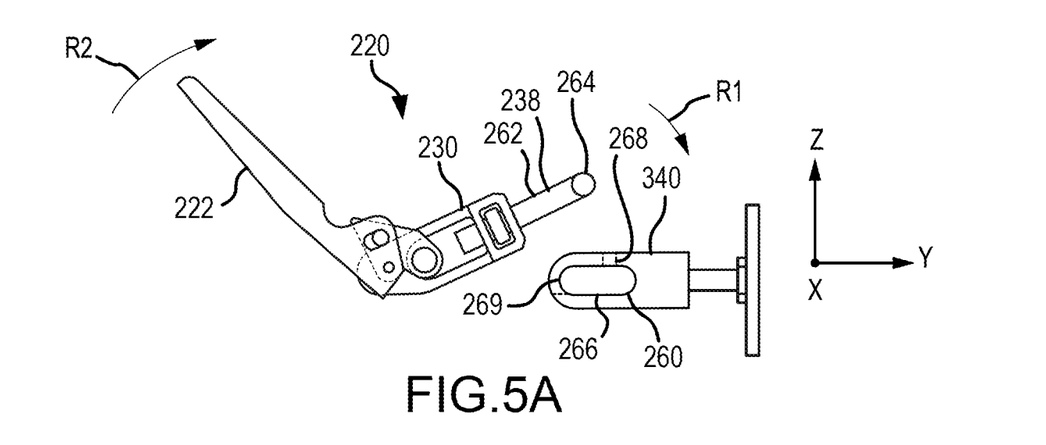
FIG. 5A, FIG. 5B, and FIG. 5C provide side schematic illustrations of a latch mechanism being coupled to a safety keeper, in accordance with various embodiments.
Figure 5B:
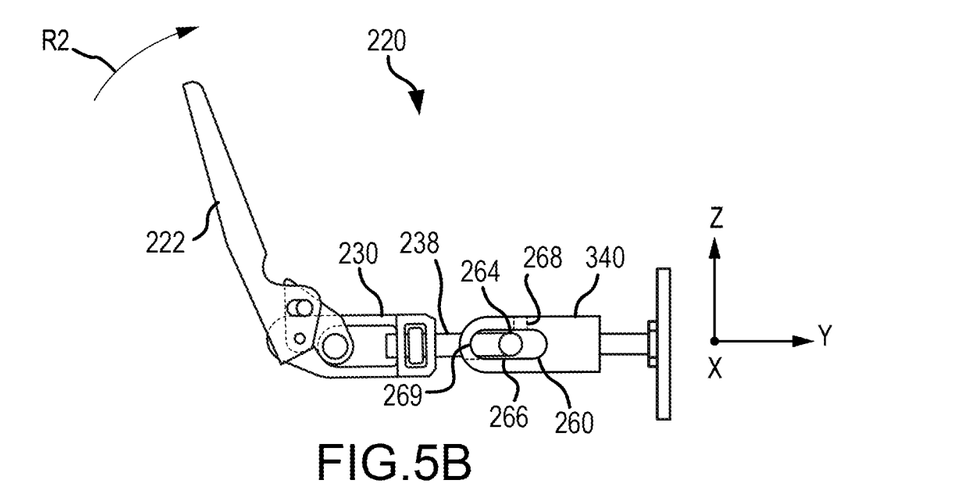
Figure 5C:
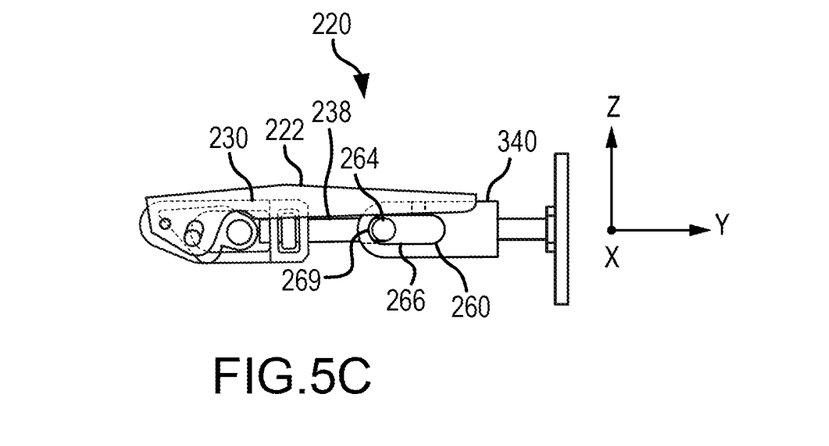

With reference to FIG. 4A through FIG. 4D, schematic illustrations of the latch mechanism 220 are provided to further describe the process of coupling or engaging safety keeper 340 to the T-bolt 238. As described above, safety keeper 340 includes a load slot 260, with the load slot 260 having a T-bolt loading portion 266 (or a longitudinal slot) and a T-bolt receiving portion 268 (or a lateral slot). As illustrated in FIG. 5A, prior to coupling the T-bolt 238 with safety keeper 340, a transverse rod 264 of the T-bolt 238 is aligned with the T-bolt receiving portion 268 of the load slot 260. Once aligned, the transverse rod 264 is inserted into the T-bolt receiving portion 268 and translated toward the T-bolt loading portion 266, typically by rotating ($R_1$) the body 230 toward safety keeper 340 by operating or rotating ($R_2$) a latch handle 222 toward the body 230 in the direction shown and as described above and with reference to FIG. 2A. As illustrated in FIG. 5B, once the transverse rod 264 is disposed within the T-bolt loading portion 266 of the load slot 260, the body 230 and T-bolt 238 are translated in a longitudinal direction (i.e., the -Y direction) until a loading end 269 of the T-bolt loading portion 266 is engaged and loaded against the transverse rod 264. The T-bolt 238 and safety keeper 340 are then coupled or engaged. Decoupling or disengaging the T-bolt 238 and safety keeper 340 is accomplished by reversing the steps outlined above.

The foregoing disclosure provides a safety keeper and a latch mechanism that constrains the loads experienced by the safety keeper to lie primarily in a longitudinal direction, thereby preventing or reducing various moments or torques that might otherwise occur when loading the latch mechanism. Reducing the moments or torques enables the loads experienced by the various components to be confined to pure axial loads, typically in tension, when the latch mechanism is in a deployed, coupled, or engaged state. The disclosure provides for a latch mechanism that provides additional safety over more conventional hook and pin assemblies for latch mechanisms, whereby a hook disposed at an end of the T-bolt body is configured to engage the pin. For example, as described above, at least two separate motions of the T-bolt are required to separate the T-bolt from the safety keeper, the first being a longitudinal translation of the transverse rod of the T-bolt with respect to the safety keeper (or the loading portion of the load slot) and the second being a lateral translation of the transverse rod of the T-bolt with respect to the safety keeper (or the receiving portion of the load slot). The two separate motions make the occurrence of an unintended decoupling or disengagement of the T-bolt from the safety keeper very unlikely. These features of the safety keeper and T-bolt enable the disclosed latch mechanism to remain engaged, even in the event a latch handle opened and/or over-center of the latch mechanism is lost, thereby minimizing the risk of losing (and/or loosening of) a cowl panel during flight.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A latch mechanism, comprising:
   a T-bolt body;
   a T-bolt comprising a longitudinal rod extending in a longitudinal direction from the T-bolt body and a transverse rod disposed at an end of the longitudinal rod; and
   a safety keeper defining a load slot configured to receive the transverse rod whereby the T-bolt is configured to secure the T-bolt body with respect to the safety keeper, wherein the T-bolt body comprises an axial cutout extending longitudinally, wherein the axial cutout is configured to receive a forward pin and enable the T-bolt body to slide in the longitudinal direction with respect to the forward pin, and wherein the T-bolt body is pivotally mounted to a cowl panel via the forward pin.

2. The latch mechanism of claim 1, further comprising a latch handle pivotally coupled to the T-bolt body, wherein the T-bolt is configured to translate along the longitudinal direction with respect to the safety keeper in response to the latch handle moving between an open position and a closed position.

3. The latch mechanism of claim 1, wherein the T-bolt is adjustable along the longitudinal direction with respect to the T-bolt body.

4. The latch mechanism of claim 1, wherein the safety keeper further comprises a transverse pin configured for coupling the safety keeper to the cowl panel.

5. The latch mechanism of claim 1, wherein the safety keeper further comprises a safety keeper longitudinal rod configured for coupling the safety keeper to the cowl panel.

6. The latch mechanism of claim 1, wherein the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

7. The latch mechanism of claim 6, wherein the transverse rod defines a characteristic dimension that is approximately equal to a lateral dimension of at least one of the T-bolt loading portion or the T-bolt receiving portion.

8. A latch mechanism, comprising:
   a T-bolt body;
   a latch handle pivotally coupled to the T-bolt body; and
   a T-bolt comprising a longitudinal rod extending in a longitudinal direction from the T-bolt body, wherein a transverse rod is disposed at an end of the longitudinal rod located externally from the T-bolt body, wherein the transverse rod is configured to translate along the longitudinal direction in response to the latch handle moving between a closed position and an open position, wherein the T-bolt body comprises an axial cutout extending longitudinally, wherein the axial cutout is configured to receive a forward pin and enable the T-bolt body to slide in the longitudinal direction with respect to the forward pin, and wherein the T-bolt body is pivotally mounted to a cowl panel via the forward pin.

9. The latch mechanism of claim 8, further comprising a safety keeper defining a load slot configured to receive the transverse rod to enable the T-bolt to secure the T-bolt body with respect to the safety keeper.

10. The latch mechanism of claim 9, wherein the safety keeper further comprises a transverse pin configured for coupling the safety keeper to the cowl panel.

11. The latch mechanism of claim 9, wherein the safety keeper further comprises a safety keeper longitudinal rod configured for coupling the safety keeper to the cowl panel.

12. The latch mechanism of claim 9, wherein the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

13. The latch mechanism of claim 12, wherein the safety keeper comprises a first longitudinal member and a second longitudinal member, and the load slot is disposed between the first longitudinal member and the second longitudinal member.

14. The latch mechanism of claim 13, wherein the T-bolt receiving portion is disposed in the second longitudinal member.

15. A nacelle, comprising:
    a first cowl panel;
    a second cowl panel moveable with respect to the first cowl panel; and
    a latch mechanism configured to secure the first cowl panel with respect to the second cowl panel, the latch mechanism comprising:
        a T-bolt body mounted to the first cowl panel;
        a T-bolt comprising a longitudinal rod extending in a longitudinal direction from the T-bolt body and a transverse rod disposed at an end of the longitudinal rod; and
        a safety keeper mounted to the second cowl panel, the safety keeper defining a load slot configured to receive the transverse rod whereby the T-bolt is configured to secure the T-bolt body with respect to the safety keeper for securing the first cowl panel with respect to the second cowl panel, wherein the T-bolt body comprises an axial cutout extending longitudinally, wherein the axial cutout is configured to receive a pin and enable the T-bolt body to slide in the longitudinal direction with respect to the pin, and wherein the T-bolt body is pivotally mounted to the first cowl panel via the pin.

16. The nacelle of claim 15, wherein the load slot comprises a T-bolt receiving portion and a T-bolt loading portion, wherein the T-bolt receiving portion comprises a lateral slot disposed in the safety keeper and the T-bolt loading portion comprises a longitudinal slot disposed in the safety keeper.

* * * * *